Nov. 11, 1947. L. H. FLORA ET AL 2,430,809
FASTENING DEVICE
Filed Sept. 27, 1946
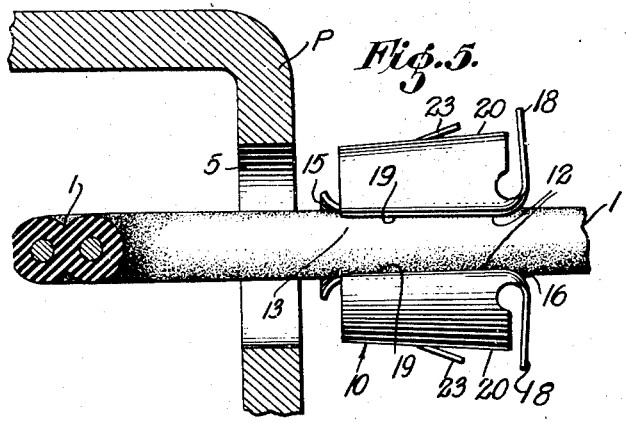
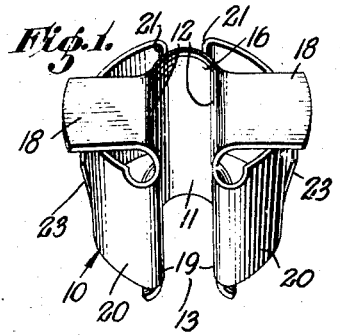
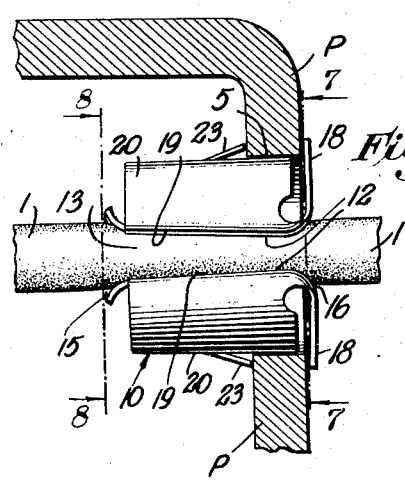
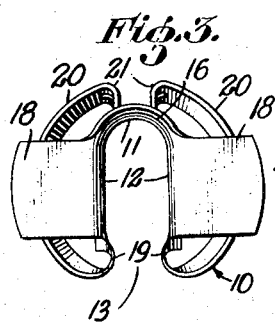
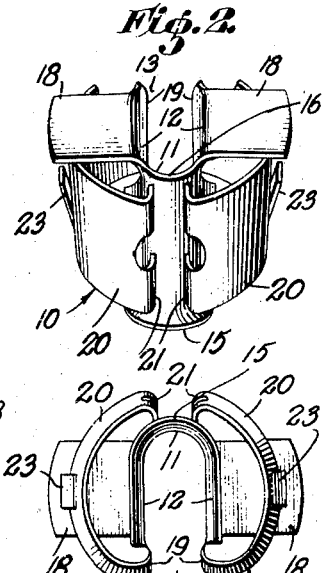
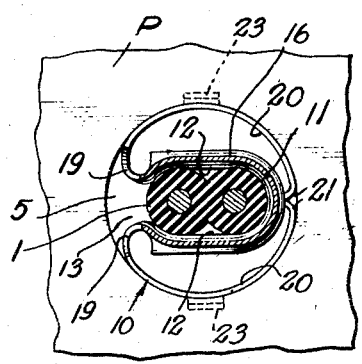
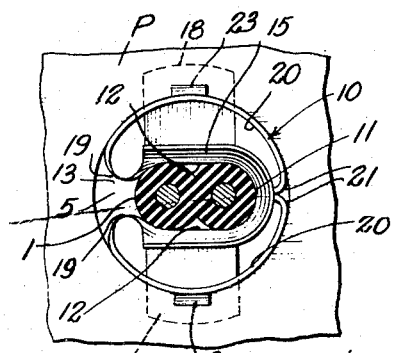
INVENTORS
LAURENCE H. FLORA
AND CHARLES A. KELLEY,
BY
H. G. Lombard
ATTORNEY Patented Nov. 11, 1947

2,430,809

UNITED STATES PATENT OFFICE 2,430,809

FASTENING DEVICE

Laurence H. Flora and Charles A. Kelley, Cleveland, Ohio, assignors to Tinnerman Products, Inc., Cleveland, Ohio, a corporation of Ohio Application September 27, 1946, Serial No. 699,816

10 Claims. (Cl. 248—56)

This invention relates, in general, to improvements in the art of securing a wire, tube, rod or similar article in an opening in a panel or the like, and deals, more particularly, with an improved clip fastening means for providing a safe and secure installation of an electrical wire or conduit extending through an opening in a panel, housing, or other part of an electrical instrument or apparatus.

The usual electrical appliance or apparatus includes an electrical wire or cord which is frequently connected to and disconnected from an electrical outlet and this results in continual tensile stress and strain on the wire which is transmitted to its point of connection with the screw or other terminal to which the wire or cord is united. The strain on the electrical wire incident to repeated connections and disconnections and other usage and handling leads to deterioration and fatigue in the wire which often causes a break in the wire adjacent the terminal screw resulting in an open circuit or a short circuit amounting to a fire hazard.

In the manufacture of electrical equipment, it is a common practice and a general requirement by insurance underwriters that the electrical wire extending from the terminals of the electrical unit through an opening in a panel or housing be provided with a knot or the equivalent which is engageable with the marginal edges of the opening to serve as a stop limiting movement of the wire through the opening. In this way, any pull, strain, or other force on the wire in the handling or usage of the electrical apparatus is prevented from causing a separation of the wire from its terminals, thereby removing the danger of a short circuit and the possible fire hazard therefrom. However, the provision of the knot in the electrical wire for this purpose is objectional in that it requires added time and labor in a distinct assembling operation and involves a loss in the length of wire forming the knot in each electrical cord and this, of course, amounts to a sizeable cost in mass production methods of manufacture.

A primary object of the invention, therefore, is to provide such an installation of a wire or conduit extending through an opening in a panel, housing, or other part of an electrical instrument or apparatus in which the safety knot in the wire for the purposes aforesaid is dispensed with in favor of an improved clip fastening device which accomplishes the same results and is easily and quickly applied by an expeditious snap fastening action to secure the wire firmly and rigidly in the panel opening and without in any way cutting or multilating the wire and its covering or causing the same to become frayed or worn after a period of use.

A further object of the invention is to provide a clip fastener of this character which has no edges or cutting surfaces in contact with the electrical wire or cord in the applied fastening position thereof in an insulation.

Another object of the invention is to provide a clip fastener for supporting and securing an electrical wire in the manner aforesaid which comprises inner wire gripping elements within outer attaching means adapted for quick and easy snap fastening application in the opening in the panel or other part with said inner wire gripping elements firmly and rigidly retaining the wire against axial movement from the secured position thereof in either direction.

A further object of the invention is for the provision of an improved clip fastener for the purposes and uses described which is strong and durable, relatively inexpensive, and lends itself to economical quantity production in that it may be produced at comparatively low cost from ordinary sheet metal strip stock with little loss or waste of material.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout the same, and in which:

Fig. 1 is a perspective view of the clip fastener per se as viewed from the top and front side thereof;

Fig. 2 is another perspective view of the fastener as seen from the top and rear side thereof;

Fig. 3 is a top plan view of the fastener;

Fig. 4 is a bottom end view of the fastener;

Fig. 5 is a front elevational view of the fastener as initially attached to an electrical wire or conduit, extending through an opening in a panel or the like, shown in section, and in position to be applied to support and secure the wire in such opening;

Fig. 6 is a view similar to Fig. 5 showing the clip in fully applied position supporting and securing the wire in the panel opening against axial movement in either direction;

Fig. 7 is a sectional view of Fig. 6 taken on line 7—7, looking in the direction of the arrows; and, Fig. 8 is a sectional view of Fig. 6 on line 8—8, looking in the direction of the arrows.

Referring now, more particularly, to the drawings, it will be understood that the improved clip fastener shown in Figs. 1–4 inclusive, is employed as illustrated in Figs. 5 and 6, to support and secure an electrical wire or conduit 1 connected at one end to the terminals of an electrical unit and extending through an opening 5 in a panel P, housing, or other part of an electrical instrument or apparatus, with the other end of the wire provided with a plug or other means for connection to a source of power. Due to frequent connections and disconnections, and other usage and handling, the wire is continually subjected to tensile strains which often cause the wire to break or pull free from its connection to the terminals in the electrical unit. The clip fastening means of the present invention is designed for easy and quick application to secure the wire in the opening in the panel or other part through which it passes to relieve any such strain on the wire and otherwise prevent any disturbance of the connection of the wire to the terminals on the electrical unit over a long period of service and under the most severe conditions of constant usage and handling.

The clip fastener for the described purposes is admirably suited for a wide range and variety of applications as employed with panel members, housings, or other parts of electrical equipment or apparatus made of metal, plastic, wood, fibreboard or other suitable material. The clip may be designed for application to panel openings of square, rectangular or other selected outline, and in the present example, the clip is shown as provided for application to a round or circular opening 5 which is the most common type easily provided by a simple punching or drilling operation. The clip fastener is a relatively simple, inexpensive article of manufacture which is adapted for quantity production at comparatively low cost in that it may be provided from standard strip stock with little loss or waste of material. The clip may be made of any suitable sheet metal preferably of a spring metal nature such as spring tempered metal or cold rolled metal having spring like characteristics, with the size, thickness and finish thereof selected according to service requirements and the cross-sectional dimensions of the electrical wire or conduit to be secured.

In Figs. 1–4 inclusive, the clip fastener designated generally 10, is shown constructed from a single piece of sheet metal which is bent intermediately to define an axially extending, substantially channel-shaped body comprising an imperforate back or rear wall 11 merging with spaced imperforate side walls 12. The spaced side walls 12 present an open longitudinal slot 13 or passage for the wire at one side of the fastener body and have a spacing, in normal untensioned relation, which is slightly less than the thickness or cross section of the electrical cord or wire. In the present example, the electrical cord is illustrated as the type made in the well known flat or generally oval shape. The spaced side walls 12 of the clip are therefore designed in the same general contour to snugly receive and embrace the wire as seen in Figs. 5, 7 and 8. Likewise, in the case of a round electrical cord the spaced side walls 12 would be rounded to approximate the generally round cross-section of the wire. In any case, the spaced side walls 12 define axially extending, spaced, resilient gripping and clamping shank members adapted to be compressed toward each other to hold the wire or cord fixedly and rigidly.

The channel-shaped body of the clip comprising rear wall 11 and side walls 12 is outwardly flared at its lower or leading end as at 15 to define a rounded lip portion devoid of sharp edges or cutting surfaces that might contact the wire and cause it to become worn and frayed. Similarly, the opposite, outer end of the clip is flared and rounded at 16 along the back wall 11 and at the junction of the side walls 12 with head sections 18 formed from extensions on said side walls and bent outwardly in opposite directions to lie generally in a common plane. Preferably the head sections 18 are bent at a slight angle beyond such common plane toward the opposite end of the clip, as seen in Fig. 5, to allow for slight yieldable engagement thereof with the marginal portions of the panel opening as shown in Fig. 6.

The side walls 12 of the fastener body adjacent the slot 13 are bent slightly inwardly to define longitudinal ribs 19 adapted to snap over the electrical cord or wire and retain the clip in initially attached relation on the wire as shown in Fig. 5. The ribs 19 merge into return bent portions of generally circular configuration defining arcuate spring arms 20 which preferably are inclined to define a substantially cone-shaped formation, as shown in Fig. 5, in which the leading end of the clip is of a size just small enough to enter the socket opening 5. The arcuate spring arms 20 otherwise define the outer, generally round periphery of the clip corresponding to the contour of the circular panel opening 5. The extremities of said spring arms are provided with inturned abutments 21 which normally are in spaced relation and have their ends in abutting engagement with the back wall 11 of the fastener body to maintain the spring arms 20 in resilient spaced relation to the axially extending, channel-shaped fastener body comprising the resilient gripping and holding elements 12.

The spring arms 20 include any suitable lug or detent means adapted for snap fastening engagement in the socket opening and, in the present example, there are employed yieldable tongues 23 which are partially severed sections bent outwardly from the spring arms in such a way that the free ends of said tongues define shoulders which are spaced from the head sections 18 a distance approximating the thickness of the panel P adjacent the socket opening 5. The tongues 23 otherwise are so designed as to yield and be compressed by the edges of the panel opening as necessary for the clip to pass therethrough to a position in which said tongues clear the opening and spring outwardly in a manner whereby the shoulders defined by the extremities of said tongues cooperate with the head sections 18 in engaging opposite sides of the panel adjacent the panel opening to lock the clip in fully applied fastening position as shown in Fig. 6.

Referring to Fig. 5, it will be understood that the clip provided substantially in the manner aforesaid is easily and quickly applied to serve as a strain relief means for an electrical cord or wire extending in operative position through an opening in a panel P, housing or other part. The clip is particularly advantageous in that it is applied to a wire or cord already in place by an operation effected entirely from the forward, readily accessible side of the panel P and does not require the tedious operation of passing the same over an end of the wire as in the case of a washer or grommet, nor access to the rearward side of the panel for securing the clip in position as is necessary with a nut secured bushing, or the like. As shown in Fig. 5, the clip is initially attached to the wire or cord 1 at the selected location by positioning the wire in line with the slot 13 in the clip and snapping the longitudinal ribs 19 of the clip over the wire as the wire is forced between the side walls 12 and against the rear wall 11 of the clip. The side walls 12 yield outwardly as necessary for the clip to be easily and quickly attached to the wire in this manner while the ribs 19 retain the clip in attached position on the wire against displacement or falling off preparatory to the application of the clip to fully applied fastening position in the socket opening 5.

With the clip attached to the wire as seen in Fig. 5, the clip is easily inserted into the panel opening in an axial direction inasmuch as the leading end of the clip preferably is designed just small enough to enter therein readily, as aforesaid. As the clip is advanced axially, the spring arms 20 cam against the edges of the panel opening and are forced to yield from their initial cone shape shown in Fig. 5, to a generally cylindrical shape having firm uniform bearing engagement with the edge surfaces of the circular opening 5. As the spring arms are thus compressed, the abutments 21 thereon move laterally from their normal spaced relation to abutting relation as seen in Figs. 7 and 8, thereby rigidifying and stiffening the spring arms 20 in bearing engagement with the edge surfaces of the panel opening. Simultaneously, the compressed spring arms 20 transmit a compressive force to the inner gripping elements or side walls 12 of the clip causing the same to squeeze and grip the wire as seen in Fig. 6 and thereby fixedly and rigidly hold the same against axial movement in either direction. In this relation, the ribs 19 in cooperation with the back wall 11 retain the wire against any possible lateral shifting or displacement from applied fastening position.

During the axial movement of the clip to applied fastening position, the snap fastening tongues 23 yield inwardly as necessary to permit the clip to be applied to a position in which the head sections 18 bear upon the outer surface of the panel. The tongues 23 thereupon clear the panel opening and are free to spring outwardly in a manner whereby the shoulders defined by the extremities of said tongues positively engage the rearward surface of the panel adjacent the socket opening as shown in Figs. 6, 7 and 8, to lock the clip in applied fastening position. In this regard, the slight inclination of the head sections 18 toward the leading end of the clip enables said head sections to serve as yieldable take-up means exerting an automatic axial drawing action on the clip to compensate for possible variations and irregularities in the thickness of the panel adjacent the opening therein. Similarly, this axial take-up provision in the head sections permits the clip to be applied to panels of varying thickness within the limits of the greatest practical spacing between the extremities of the tongues 23 and said head sections 18.

In the event that it becomes necessary or desirable to remove the clip from applied position securing the wire in the socket opening, this is easily accomplished simply by applying a suitable tool to compress the tongues 23 toward the planes of the associated spring arms 20 as necessary for said tongues to pass through said panel opening and thereby permit the clip to be withdrawn therefrom in a direction reverse to that in which it is applied. The removed clip then may be reapplied to secure the wire or cord in the same or a different location in a repetition of the foregoing described procedure.

While the invention has been described in detail with a specific example, such example is intended as an illustration only, since it will be apparent to those skilled in the art that other modifications in the construction, arrangement and general combination of parts thereof may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastening installation comprising an electrical wire or other object extending through an opening in a part in combination with a snap fastening clip fastener supporting and securing the wire in said opening, said fastener comprising a sheet metal section having an intermediate bend providing an axially extending, channel-shaped body comprising cooperating, relatively yieldable gripping members fixedly holding the wire, and a spring arm outwardly of said body having means in snap fastened engagement in said opening.

2. A fastening installation comprising an electrical wire or other object extending through an opening in a part in combination with a snap fastening clip fastener supporting and securing the wire in said opening, said fastener comprising a sheet metal section having an intermediate bend providing an axially extending, channel-shaped body comprising spaced relatively yieldable gripping members having a slot at one side thereof receiving the wire and fixedly holding the wire in attached position, a spring arm outwardly of said body in snap fastened engagement in said opening, and a lug element on said spring arm engaging a marginal portion of said opening to retain the fastener positively in snap fastened engagement in the opening.

3. A fastening installation comprising an electrical wire or other object extending through an opening in a part in combination with a snap fastening clip fastener supporting and securing the wire in said opening, said fastener comprising a sheet metal section having an intermediate bend providing an axially extending, channel-shaped body comprising cooperating, relatively yieldable gripping members fixedly holding the wire, and cooperating spring arms outwardly of said wire gripping members having means in snap fastened engagement in said opening.

4. A fastening installation comprising an electrical wire or other object extending through an opening in a part in combination with a snap fastening clip fastener supporting and securing the wire in said opening, said fastener comprising a sheet metal section having an intermediate bend providing an axially extending, channel-shaped body comprising spaced relatively yieldable gripping members having a slot at one side thereof receiving the wire and fixedly holding the wire in attached position, cooperating spring arms outwardly of said gripping members in snap fastened engagement in said opening, and a lug element on said spring arms engaging a marginal portion of said opening to retain the fastener positively in snap fastened engagement in the opening.

5. A fastening installation comprising an electrical wire or other object extending through an opening in a part in combination with a snap fastening clip fastener supporting and securing the wire in said opening, said fastener comprising a sheet metal section having an intermediate bend providing an axially extending, channel-shaped body comprising spaced, relatively yieldable gripping members having a slot at one side thereof receiving the wire and fixedly holding the wire in attached position, and outwardly return bent portions on said gripping members defining spring arms having means in snap fastened engagment in said opening.

6. A fastening installation comprising an electrical wire or other object extending through an opening in a part in combination with a snap fastening clip fastener supporting and securing the wire in said opening, said fastener comprising a sheet metal section having an intermediate bend providing an axially extending, channel-shaped body comprising spaced, relatively yieldable gripping members having a slot at one side thereof receiving the wire and fixedly holding the wire in attached position, outwardly return bent portions on said gripping members defining spring arms in snap fastened engagement in said opening, and lug elements on said spring arms engaging said part adjacent the opening to retain the fastener positively in snap fastened engagement in said opening.

7. A fastener comprising a generally channel-shaped sheet metal body having a head section and defining spaced, axially extending, relatively yieldable shank members, and a return bent portion on a shank member defining a spring arm outwardly of said body.

8. A fastener comprising a generally channel-shaped sheet metal body having a head section and defining spaced, axially extending relatively yieldable shank members, and return bent portions on said shank members defining cooperating spring arms outwardly of said body.

9. A fastener comprising a generally channel-shaped sheet metal body having a head section and defining spaced, axially extending relatively yieldable shank members separated by an open slot along one side of said body, axial ribs formed on said shank members adjacent the opening to said slot, and a return bent portion on a shank member defining a spring arm outwardly of said body.

10. A fastener comprising a generally channel-shaped sheet metal body having a head section and defining spaced, axially extending relatively yieldable shank members separated by an open slot along one side of said body, axial ribs formed on said shank members adjacent the opening to said slot, return bent portions on said shank members defining generally arcuate spring arms outwardly of said body and in spaced relation thereto, and abutments defined by the ends of said spring arms bent inwardly into engagement with the body to maintain said spring arms in spaced relation to said body.

LAURENCE H. FLORA.
CHARLES A. KELLEY.

REFERENCES CITED

The following references are of record in the file of this patent:

UNITED STATES PATENTS

| Number | Name | Date |
|---|---|---|
| 2,413,927 | Robertson | Jan. 7, 1947 |